US012583978B2

(12) United States Patent
Krause et al.

(10) Patent No.: US 12,583,978 B2
(45) Date of Patent: Mar. 24, 2026

(54) SYNTHESIS FOR PRODUCING ORDERED POLYBLOCK COPOLYMERS HAVING A CONTROLLABLE MOLECULAR WEIGHT DISTRIBUTION

(71) Applicant: FORSCHUNGSZENTRUM JÜLICH GMBH, Jülich (DE)

(72) Inventors: Daniel Krause, Münster (DE); Mariano Grünebaum, Nordkirchen (DE); Hans-Dieter Wiemhöfer, Münster (DE); Martin Winter, Münster (DE)

(73) Assignee: FORSCHUNGSZENTRUM JULICH GMBH, Julich (DE)

( * ) Notice: Subject to any disclaimer, the term of this patent is extended or adjusted under 35 U.S.C. 154(b) by 561 days.

(21) Appl. No.: 18/004,549

(22) PCT Filed: Jul. 7, 2021

(86) PCT No.: PCT/EP2021/068887
§ 371 (c)(1),
(2) Date: Jan. 6, 2023

(87) PCT Pub. No.: WO2022/008615
PCT Pub. Date: Jan. 13, 2022

(65) Prior Publication Data

US 2023/0303777 A1 Sep. 28, 2023

(30) Foreign Application Priority Data

Jul. 7, 2020 (DE) ..................... 10 2020 117 869.7

(51) Int. Cl.
*C08G 81/02* (2006.01)
*H01M 10/0565* (2010.01)

(52) U.S. Cl.
CPC ...... *C08G 81/025* (2013.01); *H01M 10/0565* (2013.01); *H01M 2300/0082* (2013.01)

(58) Field of Classification Search
CPC ....... C08G 81/025; C08G 65/337; C08F 8/00; C08F 297/046; C08F 299/00; C08L 53/00;
(Continued)

(56) References Cited

U.S. PATENT DOCUMENTS

| | | |
|---|---|---|
| 5,821,307 A | 10/1998 | Schwindeman et al. |
| 7,715,922 B1 | 5/2010 | Tan |

(Continued)

FOREIGN PATENT DOCUMENTS

| | | |
|---|---|---|
| DE | 102016207081 A1 | 10/2017 |
| JP | 2010-531375 A | 9/2010 |
| WO | 9723520 A1 | 7/1997 |

OTHER PUBLICATIONS

Tang, Tingting, et al.—Synthesis and characterization of graft copolymers with poly(epichlorohydrin-co-ethylene oxide) as backbone by combination of ring opening polymerization with living anionic polymerization, Polymer, 2014 Elsevier Ltd.

(Continued)

*Primary Examiner* — Adam A Arciero
(74) *Attorney, Agent, or Firm* — RENNER, OTTO, BOISSELLE & SKLAR, LLP

(57) ABSTRACT

The present invention relates to a process for the sequential and convergent preparation of ordered block copolymers comprising at least one non-polar and one polar polymer block, wherein the non-polar block is built up from specific monomers via a living sequential anionic polymerization by means of a Li-organyl initiator having a pKa greater than or equal to 45 and the polar block is a polymer block having a molecular weight greater than or equal to 350 g/mol and less
(Continued)

Figure 1:
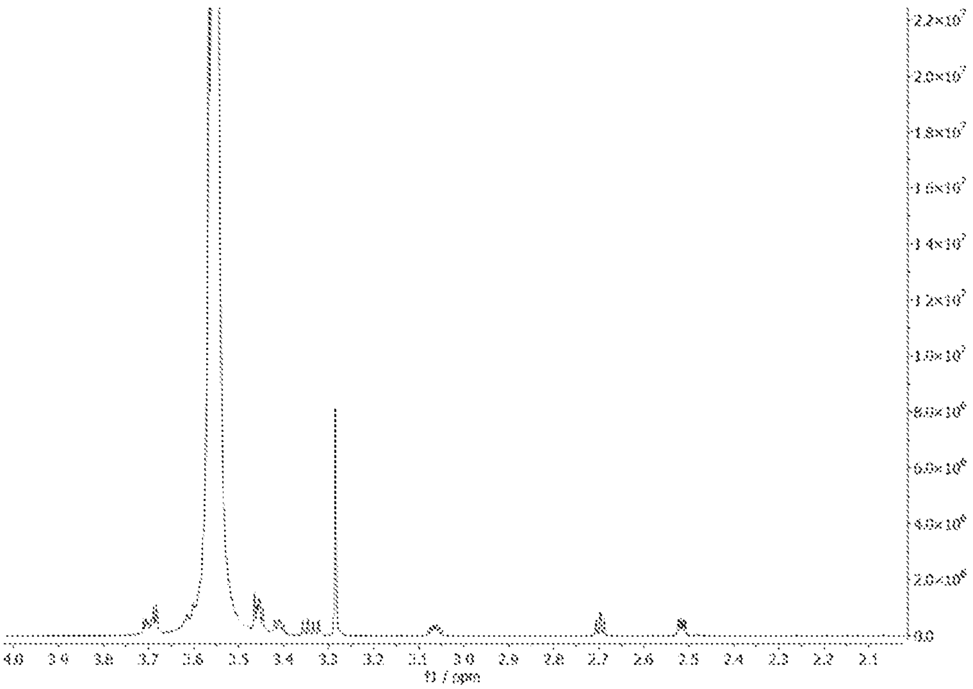

than or equal to 5000 g/mol and being built up from monomers selected from the group consisting of C2-C10 oxacyclo compounds, their derivatives or mixtures of at least two different monomers thereof, wherein the polar polymer block is covalently linked to the non-polar block anion in a single step via an epoxy functionalization of one of the monomers of the polar block, obtained via a reaction of this monomer with epichlorohydrin, in a non-polar solvent in the presence of free Li ions. Furthermore, the present invention relates to specific block copolymers having short polar chains of very uniform chain length, polymer electrolytes, and the use of the block copolymers as polymer electrolytes in secondary alkaline batteries.

16 Claims, 8 Drawing Sheets

(58) Field of Classification Search
CPC ..... H01M 10/0565; H01M 2300/0082; H01M 10/052
See application file for complete search history.

(56) References Cited

U.S. PATENT DOCUMENTS

| | | | |
|---|---|---|---|
| 2009/0104523 | A1 | 4/2009 | Mullin et al. |
| 2010/0252156 | A1 | 10/2010 | Robert et al. |
| 2012/0264880 | A1 | 10/2012 | Javier et al. |
| 2020/0102451 | A1 | 4/2020 | Yang et al. |

OTHER PUBLICATIONS

Butsele Van K, et al.—Synthesis of Novel Amphiphilic and pH-Sensitive ABC Miktoarm Star Terpolymers, Jun. 19, 2006, Center for Education and Research on Macromolecules, University of Liege, B6 Sart-Tilman, B-4000 Liege, Belgium. Revised Manuscript.

Guo Mengke, et al.—Comb-like solid polymer electrolyte based on polyethylene glycol-grafted sulfonated polyether ether ketone, research paper accepted Oct. 4, 2017, Electrochimica Acta, 2017 Elsevier Ltd.

International Search Report and Written Opinion for corresponding International Application No. PCT/EP2021/068887 mailed Nov. 12, 2021 and English translation.

SYNTHESIS FOR PRODUCING ORDERED POLYBLOCK COPOLYMERS HAVING A CONTROLLABLE MOLECULAR WEIGHT DISTRIBUTION

This application is a national phase of International Application No. PCT/EP2021/068887 filed Jul. 7, 2021, which claims priority to German Application No. 10 2020 117 869.7 filed Jul. 7, 2020, each of which is hereby incorporated herein by reference in its entirety.

The present invention relates to a process for the sequential and convergent preparation of ordered block copolymers comprising at least one non-polar and one polar polymer block, wherein the non-polar block is built up from specific monomers via a living sequential anionic polymerization by means of a Li-organyl initiator having a pKa greater than or equal to 45 and the polar block is a polymer block having a molecular weight greater than or equal to 350 g/mol and less than or equal to 5000 g/mol and being built up from monomers selected from the group consisting of C2-C10 oxacyclo compounds, their derivatives or mixtures of at least two different monomers thereof, wherein the polar polymer block is covalently linked to the non-polar block anion in a single step via an epoxy functionalization of one of the monomers of the polar block, obtained via a reaction of this monomer with epichlorohydrin, in a non-polar solvent in the presence of free Li ions. Furthermore, the present invention relates to specific block copolymers having short polar chains of very uniform chain length, polymer electrolytes, and the use of the block copolymers as polymer electrolytes in secondary alkaline batteries.

One of the basic prerequisites for the successful advance of portable electrical devices was the provision of sufficiently large and reasonably safe energy sources, which, especially in the form of alkaline secondary batteries, contributed to unimagined flexibility and usable application duration under everyday conditions. However, application safety is still a starting point for further developments today, as solvent-based liquid electrolytes in particular sometimes pose a higher risk in terms of flammability. For this reason, intensive research is being carried out into alternative electrolytes that do not, in principle, pose these risks.

Solid electrolytes, such as polymer electrolytes, which are based on polyethylene oxide (PEO) polymers and lithium conducting salts and have been researched since the 1970s, form a solvent-free class. These are safe to use and are commercially traded as so-called lithium polymer cells. Current developments are increasing the share of polymer electrolyte cells in demanding and energy-intensive application fields such as electromobility. The disadvantage of PEO-based polymer electrolytes is that they can generally only be used at temperatures above their melting point (approx. 60° C.) without sacrificing performance, as only then are the conductivities sufficient for battery applications. Other possible polymer electrolytes, such as polycarbonates, can also only be processed above their glass transition temperatures and even then exhibit rather low ionic conductivities for modern high-performance batteries. Furthermore, with these polymers, the lithium ion conductivity cannot be controlled independently of the mechanical stability, which is elementarily important in order to be able to suppress lithium dendrite growth on lithium metal anodes.

A starting point for decoupling the mechanical and ion-conducting properties of polymer electrolytes was identified in the area of building ordered micro- and nanostructures of the ion-conducting domains. By using block co-polymers (BCPs) with different but ordered block domains, the electrochemical and mechanical properties can be tailored separately. Through interaction of the polymer segments of the individual block polymers, they undergo self-assembly and an ordered network of ion-conducting domains is formed in which there is continuous decoupled fast lithium ion conduction with a simultaneously high transfer number. However, the basic prerequisite for the formation of highly organized, macroscopic domains is that the block co-polymers used have highly reproducible properties.

Some approaches to the structure and ion-conducting properties of the polymer electrolyte from block copolymers can also be found in the literature.

For example, Dörr et. al. described in Chem. Eur. J. 2018, 24, 8061-8065 (DOI: 10.1002/chem.201801521) "An Ambient Temperature Electrolyte with Superior Lithium Ion Conductivity based on a Self-Assembled Block Copolymer" possible setups and properties of block copolymers in use as polymer electrolytes.

US 2012/026 488 0 A1 discloses the synthesis of a block copolymer that simultaneously exhibits electronic and ionic conduction. To synthesize a block copolymer from poly(3-hexylthiophene) (P3HT) and poly(ethylene oxide), a combination of Grignard metathesis polymerization and click reaction is used in sequence.

Further, U.S. Pat. No. 7,715,922 B1 discloses an implantable medical device formed at least in part from a polymeric material including a base polymer and a block copolymer. The block copolymer includes at least one polyethylene oxide (PEO) block and at least one polyisobutylene (PIB) block. The PEO and PIB blocks may be coupled together by a urethane or urea linkage. The block copolymer may be a tri-block copolymer, PEO-PIB-PEO, and the base polymer may be a polystyrene-polyisobutylene-polystyrene tri-block copolymer.

Such solutions, known from the prior art, may offer further potential for improvement, especially in terms of simplicity, safety, scalability and efficiency of synthesis, as well as reproducibility of block copolymers obtainable via synthesis.

It is therefore the task of the present invention to at least partially overcome the disadvantages known from the prior art. In particular, it is the task of the present invention to propose an easily highly scalable synthesis route, which is easy and inexpensive to carry out, provides high yields and leads to ordered block copolymers with adjustable and defined structure and molecular weight of the individual blocks.

The task is solved by the features of the respective independent claims directed to the process according to the invention, to block copolymers obtainable via the process according to the invention, polymer electrolytes comprising the block copolymers, and the use of the block copolymers thus obtainable as polymer electrolytes in secondary alkali ion batteries. Preferred embodiments of the invention are described in the dependent claims, in the description or in the figures, and further features described or shown in the subclaims or in the description or in the figures may individually or in any combination constitute an object of the invention, unless the context clearly indicates otherwise.

According to the invention, the problem is solved by a process for the sequential and convergent preparation of ordered block copolymers comprising at least one non-polar and one polar polymer block, wherein the non-polar block is built up via a living sequential anionic polymerization by means of a Li-organyl initiator having a pKa value greater than or equal to 45 from monomers selected from the group consisting of conjugated dienes, styrene, vinylsilane, vinylnaphthalene, vinylmetallocenes, derivatives or mixtures thereof, and the polar block is a polymer block having a molecular weight greater than or equal to 350 g/mol and less than or equal to 5000 g/mol and being composed of monomers selected from the group consisting of C2-C10 oxacyclo compounds, derivatives or mixtures thereof of at least two different monomers, wherein the polar polymer block is covalently bonded to the non-polar block anion in a single step via an epoxy functionalization of one of the monomers of the polar block, obtained via a reaction of this monomer with epichlorohydrin, in a non-polar solvent in the presence of free Li ions.

Surprisingly, it was found that via the above outlined process, BCPs with two or more different non-polar/polar blocks can be obtained, which exhibit a particularly reproducible and uniform distribution of the chain lengths of the individual polymer blocks. By means of the process, the exact number of monomers can be determined for each polymer block within very narrow distribution limits, and this is independent of the chemical properties of the monomers used in the individual blocks. The polydispersity index (PDI) of the entire block copolymer and in particular also of the short polar block can be less than 1.04. Block copolymers that are otherwise difficult to synthesize can be flexibly obtained, which cannot be produced at all or not as efficiently via the usual processes. In particular, the synthesis effort is low and highly asymmetric BCPs can be synthesized, which are characterized by strongly different block lengths, by strongly different polarities or even by differences in both. Via the improved structure with more uniform chain lengths of the co-polymer as a whole and for the individual blocks in each case, easier access is obtained to self-assembled and highly structured BCPs, which can simultaneously exhibit both good mechanical and, if desired, controlled ion-conducting properties. For example, BCPs can be constructed with defined ion-conducting segments, such as polymer segments, which exhibit decoupled lithium ion movement and thus rapid lithium ion transport. In particular, this can be achieved by very equal, and compared to the non-polar blocks, very short polar blocks, with standard procedures leading to larger variances in the monomer number of the built polar blocks. The improved uniformity of monomer number in the polar blocks allows multiple polymers to coalesce into defined, highly ordered domains, which results in improved alkali ion conduction across the domains. By using BCPs of different monomers and chain lengths, functionalities can be selectively separated and individually optimized. Another advantage arises from the fact that the synthesis can be easily scaled up to larger production quantities and generally automated, since, in contrast to the prior art, no solvent or counterion exchange, no toxic gases, and no additional additives or catalysts are required. Moreover, via the linkage of the polar block according to the invention via specific functionalization, a very homogeneous polar block can be generated, with the functionalization having essentially the same or similar chemical properties as the monomers of the polar block. This can lead to a particularly uniform structure of the polar block including the linkage to the non-polar block.

The reaction process can be illustrated, for example, by the following scheme:

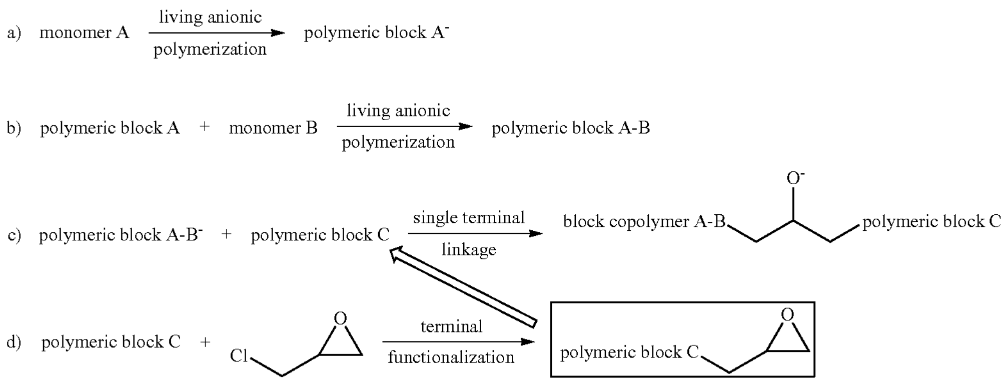

One or more nonpolar blocks A and B are built up via living sequential anionic polymerization (steps a)+b)). It is also possible to build up only one nonpolar block in this way. To this nonpolar anionic block, a third polar block (C) functionalized via an epoxy group is covalently added once in a convergent manner (step c is the convergence step). The epoxy functionalization of the polar block (C) can be obtained, for example, via a simple reaction of the polar block (C) with epichlorohydrin (step d). A negatively charged polar/non-polar block copolymer is obtained, which does not allow further addition reactions due to the association of lithium to the negatively charged oxygen of the opened epoxide group. Thus, the block C is added exactly once. In the absence of lithium, or if it is not coordinated or not sufficiently tightly coordinated to the negatively charged oxygen atom, further reactions can occur, which can lead to significantly different molecular weights of the resulting BCPs.

The process according to the invention may be particularly suitable for building BCPs with different polar blocks or block lengths. According to the prior art, ordered BCP systems with polar, for example ion-conducting polymer blocks, could previously only be built up from the respective monomers in a successively switched sequence of polymerization steps according to the basic principle of living sequential anionic polymerization. In this process, two different polymerization mechanisms have to be applied sequentially. In particular, the polar block can only be formed via living anionic ring-opening polymerization. The non-polar monomers are polymerized anionically via the carbanions and then, after exchange of the solvent and the counterion, the polar block is continued via the ring opening polymerization of the formed oxygen anions of the opened epoxy rings.

For example, to build a lithium ion-conducting domain based on a polar PEO block during BCP synthesis from the prior art monomer (ethylene oxide gas), a complex two-step synthesis process is required:

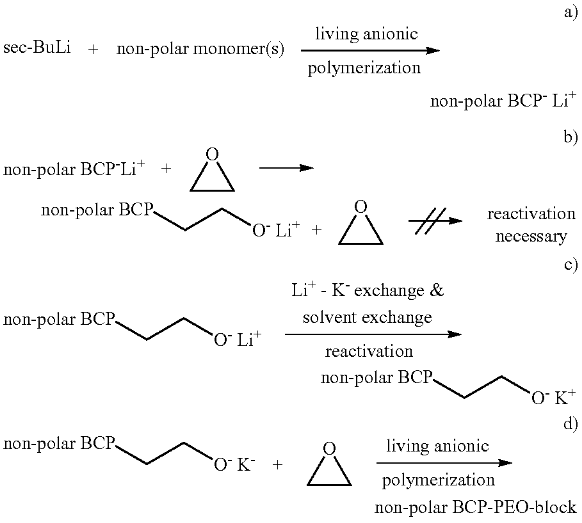

In a first step, a defined polymer block is built up from nonpolar monomers via living anionic polymerization (step a)). At the end of the step, a polymer anion with lithium as counterion is present. In order to attach polar ethylene oxide, for example, to this anionic polymer block, a complex exchange of the lithium by potassium is required, since further reactions, for example of ethylene oxide, are excluded due to the stronger association of the lithium to the anion (step b and step c). Only after cation exchange and solvent exchange can ethylene oxide be attached to the block polymer anion via a further, living (ring-opening) polymerization (step d)). Thus, the defined assembly of polar on non-polar blocks, for example, to prepare ion-conducting di-, tri-block and higher multi-BCPs, becomes cumbersome and expensive. This is in contrast to the preparation according to the invention presented above, in which BCPs for tailor-made polymer electrolytes can be synthesized, whereby the use of toxic and highly explosive ethylene oxide gas is unnecessary and the polar block is convergently bonded to the nonpolar anionic polymer block end. In addition, it is advantageous that very short polar blocks can also be reproducibly attached via the process according to the invention.

The process according to the invention is a process for the sequential and convergent preparation of ordered block copolymers comprising at least one non-polar and one polar polymer block. Within the process according to the invention, co-polymers are obtained. Co-polymers are polymers which consist of at least two different monomer units. The different monomer units are not arranged randomly within the polymer chain. The respective monomer units are located in separate areas of the polymer chain. This results in individual blocks for the different polymers. According to the invention, the assembly of the polymer chain is carried out sequentially and convergently, which means that the production of the BCP is not carried out within a single production step, but by at least two different and downstream steps, although the production is carried out as a "one-pot" reaction within the same reaction environment. The attachment is performed convergently by a single reaction of the end-functionalized monomer of the polar block. The downstream manufacturing steps then each involve at least the assembly of a single block of the BCP. It is also possible that a single block is obtained via polymerization of individual monomers rather than in total. Moreover, ordered BCPs are obtained via the process. Ordered in this context means that co-polymers are obtained which are in principle capable of aligning at least part of the polymer blocks, for example the polar block, in semi-crystalline or crystalline structures. The polymers are thus capable of forming a defined, ordered structure among themselves, at least for certain subregions. The ordered structures can be detected, for example, by X-ray scattering methods. The number of different blocks for forming the BCP is in principle not limited. Conveniently, the BCPs have at least two, preferably at least three, different monomer units in the BCP. The maximum number of different blocks can be less than 10, preferably less than 8, further preferably less than 5. In this context, the terms "non-polar" and "polar" refer to the polarity of the individual monomers and, accordingly, the polarity of the chain segments or blocks produced therefrom. Polar blocks are obtained from polar monomers with heteroatoms in the monomer, such as oxygen or nitrogen. Halogens are excluded as heteroatoms. Non-polar monomers or blocks comprise monomers of essentially hydrocarbons, without heteroatoms, such as boron, oxygen, nitrogen, sulfur, phosphorus, or halogens. Examples of nonpolar monomers include conjugated dienes, styrenes, vinylnaphatlines, vinylmetalocenes, and vinylsilanes.

The non-polar block is built up via a living sequential anionic polymerization by means of a Li-organyl initiator with a pKa value greater than or equal to 45 from monomers selected from the group consisting of conjugated dienes, styrene, vinylsilane, vinylnaphthalene, vinylmetallocene, their derivatives or mixtures thereof. To build ordered BCPs, it has been found to be particularly advantageous that at least one polymer block is obtained via a living anionic polymerization. A living polymerization is understood to be chain polymerizations in which no termination reactions and chain transfers occur and monomers are added to an already formed anionic chain structure via a nucleophilic attack of the resulting carbanions. Different blocks can thus only be linked in the order of decreasing pKa values of their monomers. Under "living conditions", the control of molecular masses with very narrow distribution becomes possible. Furthermore, clearly defined polymer structures, such as BCPs with fixed sequence lengths, can be generated under these conditions. One possibility for this type of process control is given later in the examples. The nonpolar block consists of nonpolar monomers, and the indicated group of monomers throughout the block polymer can contribute to the formation of improved mechanical properties. In addition, it has been surprisingly found that these monomers can also positively influence the crystallization behavior and properties of the polar block that follows. Without being bound by theory, it seems that the structure achievable via the polar block by addition of several nonpolar blocks to each other, can also be influenced and controlled via the one framework function of the nonpolar block. In particular, a combination of a selection from the above-mentioned group of nonpolar monomers can lead to particularly ordered BCPs in the process according to the invention. The nonpolar monomers can be easily converted into a nonpolar and defined polymer block by means of a living anionic polymerization. These derivatives are understood to be mono- or polysubstituted conjugated dienes, styrenes, vinylnaphtalines, vinylmetalocenes and vinylsilanes, the substituents of which may consist of linear and/or branched alkyl chains and/or alkoxy chains with a chain length of C1 to C10. Conjugated dienes can be, for example, butadiene, isoprene or methylisoprene. Styrene derivatives are understood to be derivatives such as styrene, 4-methylstyrene, 4-(1-adamanthyl)-alpha-methylstyrene, 3-(dimethylisopropylsiloxyl)-styrene. Vinylmetallocenes can be, for example, vinylferrocene, vinylcobaltocene, vinylmanganocene or vinylnickelocene. Possible Li-organyl initiators comprise at least lithium and an organic radical, wherein the organic radical may be aliphatic or aromatic. For example, the following Li-organyl initiators can be used in the process according to the invention: Alkyllithium such as methyllitihum, ethyllithum, propyllitihum, isopropyllithium, n-butyllithium, sec-butyllithium, tert-butyllithium, pentyllithium, isopentyllithium or neopentyllithium. Aromatic lithium organyl initiators include, for example, phenyllithium or napthyllithium. The corresponding pKa values of the initiator(s) used can be found in the literature.

The polar block is a polymer block with a molecular weight greater than or equal to 350 g/mol and less than or equal to 5000 g/mol and consists of monomers selected from the group consisting of C2-C10 oxacyclic compounds or mixtures of at least two different monomers thereof. In particular, the process according to the invention can be used to bind very defined polar monomer blocks from the above-mentioned group. The proposed synthesis thereby leads to very uniform block copolymers, with the molecular weight distribution in particular being extremely homogeneous. In particular, this can lead to the fact that this very homogeneous molecular weight distribution of the block polymers is particularly suitable for the construction of polymer electrolytes. According to the invention, no individual monomers, but rather relatively short polar chains are convergently attached to the nonpolar block anion in a single step. The C2-C10 oxacyclo compounds may include, for example, ethylene oxide, propylene oxide, butylene oxide, etc. Preferably, C2-C4 oxacyclo compounds in particular can be used to build the polar block. Derivatives of C2-C10 oxacyclo compounds are understood as single or multiple substitutions, where the substituents may consist of linear and/or branched alkyl chains and/or alkoxy chains with a chain length from C1 to C10.

The polar polymer block is covalently linked to the non-polar block anion in a single step via an epoxy functionalization of one of the monomers of the polar block, obtained via a reaction of this monomer with epichlorohydrin, in a non-polar solvent in the presence of free Li ions. The attachment of the polar polymer block occurs via chemical functionalization of at least one of the monomers of the polar polymer block chain, with attachment to the polymer anion of the nonpolar block then occurring via this functionalization. Epichlorohydrin reacts with a monomer of the polar block via the chlorine-functionalized C atom, leaving an epoxide group on the polar block. This epoxy end-functionalized polar polymer block is capable of forming a onetime covalent bond with the polymer anion in the anionic polymerization reaction environment. In this respect, the polar polymer block before the reaction consists of the polar chain and only the further epoxy group functionally attached. The functionalization of the polar block takes place outside the reaction solution of the anionic polymerization. In the method of preparation according to the invention, it is a convergent synthesis, so only the functionalized polar block is added to the anionic polymerization solution. Thus, the functionalized polar block is added to the anionic polymerization solution. Depending on the choice of functional linkage, the polar polymer block may have more or less consistent chemical and physical properties. If the chemical functionalization is carried out with epichlorohydrin, similar chemical properties to those of the monomers of the polar block are obtained via the resulting epoxy functionality. The attachment of the polar polymer block can be carried out without much disturbance of the polar polymer structure with very homogeneous properties of the functionalized polar block. The latter can lead to improved crystalline structures in particular, if several block copolymers are thus combined to form ordered structures, either as such or in subregions. The reaction is necessarily carried out in a non-polar solvent in the presence of free lithium ions. Free lithium ions are ions that are able to coordinate polar/nonpolar at the negative oxygen of the bond site and thus prevent a further reaction at the negatively charged oxygen. Non "free" lithium ions are present, for example, as insoluble lithium salts, for example LiF, LiCl or bound to other sites of the block copolymer. These lithium ions cannot interact with the negatively charged oxygen due to the fixed coordination at other sites and thus cannot prevent unwanted, additional addition steps. Non-polar solvents are solvents selected from the group of aromatic hydrocarbons without a heteroatom. Possible non-polar solvents can be, for example, benzene, toluene, xylene, mesiytlene or other single or multiple alklysubsituted derivatives or mixtures of at least two solvents from this group.

In a preferred embodiment of the process, the polar block may be a polyethylene oxide block. The process according to the invention has proven to be particularly advantageous in cases where a very short, polar polymer block has to be bonded to a larger non-polar polymer block. This embodiment is very difficult to implement with prior art methods (see above), since consistent control and tracking of the conversion with very short chain lengths is very difficult to perform analytically. Moreover, with very short polymer chain lengths of the polar polymer block, small perturbations in the synthesis immediately result in large relative deviations in the composition. In this respect, it is precisely in these synthesis situations that the method according to the invention can contribute to a nevertheless significantly more reproducible composition of the individual BCPs. In particular, the method according to the invention can be used to bind very defined, polar ethylene oxide blocks. The proposed synthesis thereby leads to very uniform block copolymers, with the molecular weight distribution in particular being extremely homogeneous. In particular, this can lead to the fact that this very homogeneous molecular weight distribution of the block polymers is particularly suitable for the construction of polymer electrolytes.

Within a preferred embodiment of the process, in order to functionalize the polar polymer block, this block can be deprotonated with a base selected from the group consisting of lithium hydride, sodium hydride, potassium hydride, potassium tert-butanolate, lithium tert-butanolate, sodium tert-butanolate, potassium metal, sodium metal, lithium metal, lithium bis(trimethylsilyl)amide or mixtures thereof and subsequently reacted with epichlorohydrin. Crucial for the selection of the base used to deprotonate the terminal hydroxy group(s) of the PEG-based chain is that it is a strong base but at the same time a weak nucleophile. The reaction time, the concentration or concentration ratio of the components to each other, the solubility of the individual components and the chemical properties of the salt formed by the final functionalization all play a crucial role in quantitative conversion. This is all the more true because the oligomeric reactant and the epoxide end-functionalized product can hardly be distinguished from each other analytically, and they cannot be separated from each other if the conversion is incomplete. This base selection has proven to be particularly suitable for achieving complete conversion within short reaction times.

In a further embodiment of the process, the nonpolar solvent may be selected from the group of aromatic hydrocarbons or mixtures thereof. In particular, performing the coupling of the different blocks in solvents such as, for example, toluene or benzene can lead to particularly small PDIs of the block copolymer. Without being bound by theory, this may be due to the special interaction of the solvent with the lithium ion and the negatively charged adduct, which prevents further reaction at this center particularly efficiently and thus contributes to a particularly controllable addition reaction.

Within a further preferred aspect of the method, the Li-organyl initiator may be an alkylithium initiator having a pKa value greater than or equal to 50. The structure of the non-polar block according to the invention and the linkage of the polar block according to the invention can be particularly favorably represented via an alkylithium initiator with a pKa value greater than or equal to 50. This process control leads to block polymers with very defined and low polydispersity and can also significantly reduce the effort of separation and purification operations of the block copolymer.

Furthermore, according to the invention, a block copolymer is obtained by the process according to the invention. By means of the process according to the invention, BPCs can be obtained having a more uniform structure compared to the block copolymers known from the prior art. A very large number of combinations of different monomers, also with different polarities, can be processed, and in this respect ordered block copolymers become available, which are not obtainable in this way via the prior art process. The different blocks are bonded in such a way that the structure of the individual blocks and the steric interactions between the BCPs are disturbed as little as possible. This results in more uniform mechanical and also ion-conducting properties. The reaction can be controlled to a high degree, so that only very small deviations in the molecular weights result for the individual BCPs. The representable uniformity in terms of molecular weight is not obtainable in this way via multiple, sequential anionic polymerizations or comparable processes for building up ordered block copolymers.

In a further preferred embodiment, a block polymer may be according to the invention comprising a non-polar block of conjugated dienes, styrene, derivatives thereof or mixtures thereof and a polar polymer block having a molecular weight greater than or equal to 450 g/mol and less than or equal to 3000 g/mol of ethylene oxide, wherein the polar polymer block is reacted with an epichlorohydrin and is covalently bonded to the non-polar block once via the epoxy group remaining on the polar block. The advantages of this block copolymer are discussed in the scope of the method and use according to the invention.

In a preferred embodiment of the block copolymer, the polar block and the overall block copolymer may have a polydispersity of greater than or equal to 1.0 and less than or equal to 1.05. In addition to the chemical uniformity of the attachment site of the different polymer blocks, both the polar blocks and the overall obtainable BPCs can have a highly reproducible molecular weight. Thus, a monodisperse molecular weight distribution of the polymer aggregate results, with polydispersity calculated from the ratio of weight to number average. The molecular weight of the individual BCPs can thereby be obtained, for example, via GPC measurements. Preferably, the polydispersity of the obtainable block copolymers can be greater than or equal to 1.0 and less than or equal to 1.05, further preferably greater than or equal to 1.0 and less than or equal to 1.04.

Within a further preferred embodiment of the block copolymer, the block copolymer may have a molecular weight greater than or equal to 20 kg/mol and less than or equal to 250 kg/mol. In particular, the block copolymers of the invention can be short to medium chain co-polymers in the molecular weight range indicated above. Via the specification of relatively short, polar polymer blocks within the block copolymer, an essentially non-polar block polymer results, in which the short polar domains can preferentially attach to each other. Combined with the property that the polar blocks are ideally all of the same length, significantly improved ordered structures can be provided. This advantage of improved self-assembly can be particularly observed when alkali ions, especially lithium ions, are intercalated into the forming ordered polar polymer structures. Preferably, the molecular weight can be greater than or equal to 25 kg/mol and less than or equal to 150 kg/mol, further preferably greater than or equal to 30 kg/mol and less than or equal to 110 kg/mol.

Within a further preferred aspect of the block copolymer, the polar polymer block may be an ethylene oxide block, wherein the ethylene oxide block has a molecular weight greater than or equal to 450 g/mol and less than or equal to 3000 g/mol. The advantage of improved self-assembly by intercalation of multiple polymers may be particularly apparent in cases where relatively short-chain polar ethylene oxide blocks are present. Within the largely non-polar polymer block, the individual short polar domains may coalesce to form an at least partially crystalline or lamellar structure. Through these highly ordered structures, alkali metal ions in particular can diffuse. In this sense, the specified molecular weight range may help to obtain improved ionic conductivities within an electrolyte of multiple block polymers.

According to a preferred characteristic of the block copolymer, the non-polar polymer block can be a polyisoprene-polystyrene diblock polymer and polar polymer block can be an ethylene oxide block, wherein the weight ratio of polar to non-polar block polymer proportions, expressed as weight of polar block divided by weight of total BCP, is greater than or equal to 0.5% and less than or equal to 10%. Within these proportions of non-polar and polar blocks, particularly suitable block copolymers can be provided, especially in conjunction with a highly reproducible molecular weight distribution. These block copolymers can be particularly suitable for use as a base structure in alkali metal batteries, whereby improved ionic conductivities can be achieved based on the very low polydispersity. Further preferably, the weight ratio can be greater than or equal to 1% and less than or equal to 7%, further preferably greater than or equal to 1.5% and less than or equal to 6%.

Furthermore, the use of a block copolymer according to the invention for use as a polymer electrolyte in alkali ion batteries is in accordance with the invention. Due to the highly reproducible, ordered structure, the BCPs produced according to the invention are particularly suitable for the construction of polymer electrolytes in alkali ion batteries. The polymer electrolyte comprises in total at least one alkali ion salt, a solvent and the block polymers according to the invention. Where appropriate, the electrolyte may contain residual solvent remaining in the product. The residual solvent may be firmly "incorporated" into the structure or "retained" by the alkali ion salt, and the residual solvent may also be particularly useful for further increasing alkali ion mobility and thus ionic charge transport. A combination or an association of polar lithium ion conducting domains within an ordered BCP matrix with an extremely high local salt concentration can, at the same time as very short PEO block lengths, lead in particular to fast lithium ion conduction with decoupling of polymer segment mobility. As a result, the 3D-structured BCP achieves a high overall conductivity of greater than 1 mS/cm even at lower temperatures (for example, −20° C.) and maintains the very high overall conductivity over a very wide temperature range, for example, from −20° C. to 90° C. Classical amorphous PEO-based salt-in-polymer electrolytes achieve this overall conductivity only above 80° C. BCPs with very short PEO blocks also show an increased lithium ion transfer number by a factor of 3 to 4 compared to pure salt-in-PEO. Compared to salt-in-PEO systems, this shows a further selective increase in lithium ion partial conductivity with improved mechanical stability. Thus, improved polymer electrolytes can be obtained which, separately controllable, exhibit both improved ionic conductivity and mechanical properties.

In a further preferred embodiment of use, the EO/alkali ion ratio in the polymer electrolyte of the alkali ion battery may be greater than or equal to 1:1 and less than or equal to 1:20. The improved alignment of the block polymers with each other based on the highly reproducible molecular weight distribution of the individual block copolymers can contribute to particularly improved conductivities in polymer electrolytes, especially with the above EO/alkali ion ratio. The improved conductivities can also result over an enlarged temperature range and, moreover, it is possible that the change in conductivity as a function of temperature increases more uniformly over a wider temperature range than in previously available polymer electrolytes. For example, all alkali ion salts that are very soluble in aprotic polar solvents can be used as possible conducting salts. These conducting salts include, for example, $LiPF_6$, LiFSI, analogous sulfonylimides or mixtures thereof. Particularly high conductivities can be achieved, for example, with the conducting salt LiTFSI.

Further according to the invention is a polymer electrolyte, wherein the polymer components of the polymer electrolyte comprise the block copolymers according to the invention. The construction of polymer electrolytes with a proportion of the BCPs according to the invention can significantly improve the ion-conducting properties of the polymer electrolytes. For example, the addition of the BPCs can improve the temperature response and/or ionic conductivity. In many cases, the addition can further increase the mechanical strength of the electrolyte. The addition of the BCPs according to the invention relative to the total polymer component of the polymer electrolyte may preferably be greater than or equal to 25 wt % and less than or equal to 100 wt %, further preferably greater than or equal to 50 wt % and less than or equal to 100 wt %, and further preferably greater than or equal to 75 wt % and less than or equal to 100 wt %.

In a preferred embodiment of the polymer electrolyte, the polymeric components of the polymer electrolyte may comprise the block copolymers according to the invention. The particular advantages of the BCPs according to the invention can arise to a particularly high degree if the basic polymeric structure of the polymer electrolytes is built entirely from the BCPs according to the invention. In these cases, very high ionic conductivities can be provided over wide temperature ranges. Without being bound by theory, this appears to be due to a particularly favorable alignment of the relatively short polar domains of the different polymers, which leads to a particularly efficient conduction of ions as a function of an applied voltage. The polymer electrolyte can consist of the BCPs of the invention if the proportion of further polymers acting as polymeric components of the polymer electrolyte is less than or equal to 5% by weight, further preferably less than or equal to 2.5% by weight and further preferably less than or equal to 1% by weight.

Within a further preferred embodiment of the polymer electrolyte, the polymer electrolyte may have a conductivity greater than or equal to 1 mS/cm at −20° C. The polymer electrolytes made from the BCPs according to the invention can provide significantly improved conductivities even at very low temperatures due to the very low PDI of the BCPs. This can be highly likely due to the low number of unwanted impurity atoms ensured by the consistent fabrication. In addition, the very uniform length of the BCPs can contribute to a very ordered alignment of the polar domains, which has a favorable effect on the representable ionic conductivity.

According to a preferred characteristic of the polymer electrolyte, the polymer electrolyte can exhibit a conductivity of greater than or equal to 1 mS/cm over a temperature range of greater than or equal to −20° C. and less than or equal to 90° C. Surprisingly, it has been shown that the polymer electrolytes of the invention containing polymeric components from the BCPs of the invention can provide exceptionally high conductivity over a particularly wide temperature range. Without being bound by theory, this may be due to the particular arrangement of the polar chains, which is achieved because of the very uniform chain lengths of the nonpolar and polar blocks. These structures appear to be stable over a particularly wide temperature range.

According to a preferred characteristic of the polymer electrolyte, the polymer electrolyte may have a residual solvent content of greater than or equal to 0.1 wt % and less than or equal to 30 wt %. Surprisingly, it has been shown that a small amount of residual solvent in the polymer electrolytes can contribute to improved conductivity. The residual solvent is the solvent used to dissolve the conducting salt and BCP. The residual solvent apparently not only serves as a classical solvent in these, but also coordinates to the alkali ion salts incorporated in the BCP. The coordination can apparently contribute to improved conduction of Li ions, so that very high conductivities can be achieved even at low temperatures. Aprotic polar solvents, for example, from the group of ethers, carbonates, lactones, esters, nitriles, sulfones, phosphates or mixtures of these can be used as "associating" residual solvents. The use of, for example, THF, PC, GBL, MTBE or DMC or mixtures of at least two of these has been shown to be particularly advantageous. Significant effects can already be produced at a weight fraction of less than or equal to 20% by weight, preferably less than or equal to 15% by weight, the weight fraction being based on the weight of the polymer electrolyte consisting of polymer, conducting salt and solvent.

Further according to the invention is a Li-ion battery comprising the polymer electrolyte according to the invention. For the advantages of the Li-ion battery according to the invention, explicit reference is made to the advantages of the BCPs according to the invention and the advantages of the polymer electrolytes according to the invention that can be produced therefrom.

Further advantages and advantageous embodiments of the objects according to the invention are illustrated by the figures and explained in the following examples. It should be noted that the figures are descriptive only and are not intended to limit the invention in any way.

EXAMPLES

A BCP is built up from two non-polar and one short polar block. The short polar block is a "prefabricated" PEO block, which is covalently attached in a one-step and one-time convergent manner to the two polymer blocks built up by a living sequential anionic polymerization.

The chemicals used had a purity greater than or equal to 99% and the water content was below 10 ppm.

1. Functionalization of PEO Blocks with Different Molecular Weight.

PEG-based chains with molecular weights of 164 g/mol, 350 g/mol, 750 g/mol, 1000 g/mol, 1900 g/mol, 2000 g/mol and 3000 g/mol were functionalized.

All PEO blocks were functionalized as described below and characterized using the same measurement equipment and measurement conditions.

Under an inert gas atmosphere, 896 mg (9.32 mmol) of the sublimed base sodium tert-butanolate is dissolved in 60 mL of THE dried over molecular sieve at room temperature in a flask with stirring. In parallel, 12.11 g (6.29 mmol) of PEG-based chains (mPEG with a chain length of 1900 g/mol, the m in mPEG represents that a terminal methyl group is attached to one side of the PEG chain) dried in high vacuum is stirred and dissolved in 60 mL of THE dried over molecular sieve at room temperature under inert gas atmosphere overnight in another reaction flask. Then, under an inert gas atmosphere, the base dissolved in THF is transferred to the reaction flask and stirred for about 72 h under an inert gas atmosphere at room temperature. After this period, the deprotonation of the PEG-based chain is completed and 4.54 g (49.04 mmol) of the epi-chlorohydrin dried over molecular sieve is then added dropwise within 15 min under inert gas atmosphere and stirred for about 6 days at room temperature under inert gas atmosphere. Then the volatiles (THF, tert-butanol and excess epichlorohydrin) are removed under vacuum at a temperature below 60° C. To the dried residue, 40 mL of dry THF is added over molecular sieve under inert gas atmosphere and stirred overnight at room temperature under inert gas atmosphere. The salt formed and precipitated during the reaction is then separated from the solution via centrifugation followed by filtration. The solvent is removed under vacuum at room temperature.

The product obtained is dissolved in a little toluene under gentle heating. To precipitate the product, the heated solution is centrifuged after addition of precooled diethyl ether. The product is freed from residual diethyl ether and other volatiles by drying under vacuum and then dried under high vacuum for several days.

The product obtained is characterized by quantitative $^1$H-NMR (500 MHz) (FIG. 1) and IR spectrometry. The NMR measurement has been performed at T=300 K in $CDCl_3$ (7.26 ppm). For the 1H NMR spectrum of the end-functionalized PEO chains, 32 scans are run with a Bruker AVANCE NEO 500 MHz with an acquisition time from the FID (AQ) of 4.72 sec and a waiting time until the next scan (d1) of 30 sec. The spectrum is evaluated with the software MestReNova 12.0.4-22023.

The peaks at a chemical shift of 2.52 ppm, 2.7 ppm and 3.06 ppm are characteristic of the epoxide group protons attached to the PEG chain end by functionalization, and the intensities of these three peaks are equal, as expected for the different protons. The peak at a chemical shift of about 3.29 ppm is attributable to the three protons of the methyl group located at the PEG chain end. The conversion is quantitative, which is shown by the fact that the area under the 3.29 ppm peak corresponds to the sum of the three peaks characteristic of the epoxide group protons. The peaks in the chemical shift region of about 3.73-3.31 ppm are attributable to the non-terminal (i.e., the groups at the chain end) protons of the PEG chain. In the IR spectrum (not shown), no OH groups can be detected after functionalization of the PEG.

2. Structure of the BCP

All the BCPs prepared were synthesized as described below, with only the initiator and monomer amounts being adjusted or changed according to the desired BCP composition. Characterization was carried out using the same instrumentation and measurement conditions.

A diblock copolymer of polyisoprene (PI) and polystyrene (PS) is built up by living sequential anionic polymerization and then reacted with the end-functionalized PEG chain to form the corresponding triblock copolymer.

Figure 2:
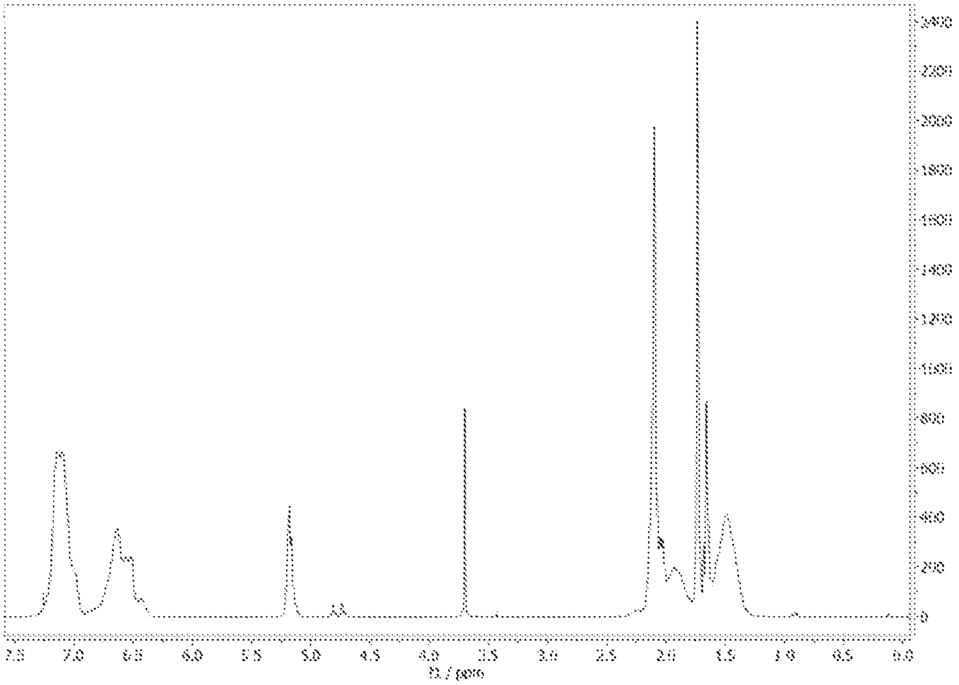
Figure 3:
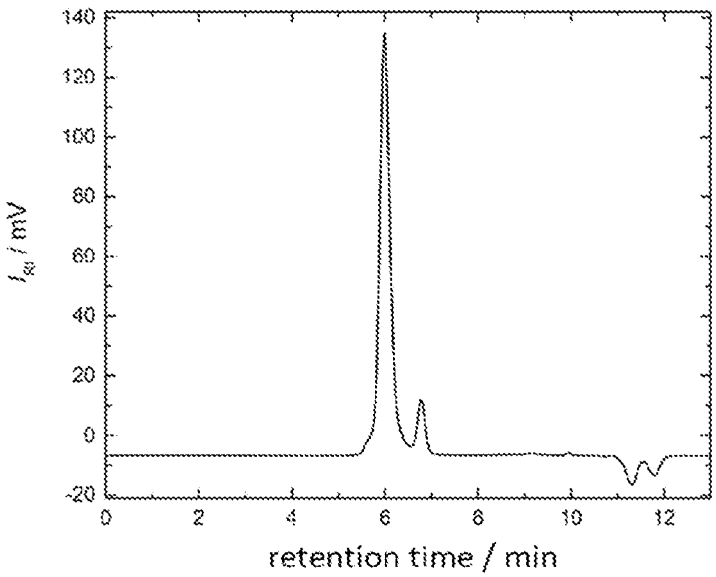

The living sequential anionic polymerization is carried out under inert gas atmosphere at room temperature. The toluene, isoprene and styrene were each previously dried over molecular sieve and freshly distilled under inert gas atmosphere before use. First, the two nonpolar blocks (first PI and then PS) of BCP are built up. To do this, 134 g of toluene is added to a reaction flask. Then, 178 μL of a 1.43 M cyclohexane solution of the initiator (sec-butyllithium) is added with stirring. Then 4.02 g (58.97 mmol) of the isoprene is added to the reaction solution and allowed to react overnight with stirring. Next, 9.73 g (93.42 mmol) of styrene is added to the reaction solution and also allowed to react overnight. A sample is taken from the reaction solution for GPC measurement of the PI-PS block. Then, 0.7598 g (383.28 μmol) of end-functionalized PEG-based chain ($M_n$=1900 g/mol) is added to the live PI-PS anion solution with stirring. The mixture is stirred for 3 days. After this time, 250 μL of a 1.2 M methanolic hydrochloric acid is added to the product, dried and dissolved in dichloromethane. The obtained solution is slowly dropped into a methanol template, the liquid is decanted and the precipitated BCP is dried. The product obtained is dried under high vacuum. A white solid is obtained, which is characterized via quantitative $^1$H-NMR spectroscopy (FIG. 2) and GPC chromatography (FIG. 3).

Figure 4:
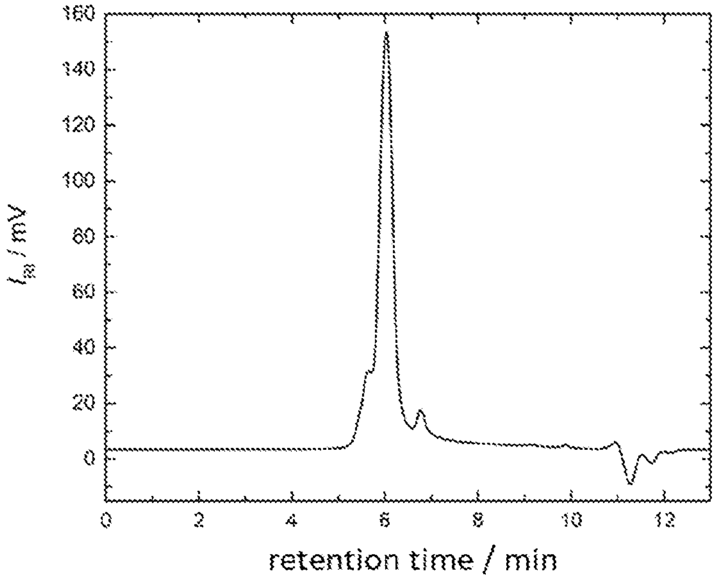

The GPC chromatograms of the PI-PS block (FIG. 4) and the PI-PS-PEO block (FIG. 3) were recorded with a measuring time of 0-13 min and a measuring interval of 100 msec (column TSKgel GMHHR-N, flow rate 1 mL/min, solvent THF, T=40° C.). A comparison of the GPC chromatograms shows that the added PEO block is too short to give a significant signal in the GPC chromatogram. There is only a slight tendency, if any, toward heavier $M_n$ (101,400 g/mol to 107,500 g/mol). However, it can be inferred that the functionalized PEO chains were attached to the PI-PS anion exactly once, otherwise higher $M_n$ of BCP would result because the end-functionalized PEG-based chains are added in excess to the reaction solution. A very good polydispersity of less than 1.1 is achieved (polydispersity=$M_w/M_n$).

The quantitative $^1$H-NMR spectrum of the triblock copolymer (FIG. 2) shows a small peak at a chemical shift of 7.26 ppm, which is attributable to the solvent $CDCl_3$. The peaks in the range of about 7.3-6.3 ppm can be assigned to the protons of the phenyl radical of the polystyrene. The peaks in the range of about 5.3-4.6 ppm are to be assigned to the protons on the double bonds of the (1,4 and 3,4) polyisoprene. The peak at about 3.7 ppm is to be assigned to the protons of the PEO. Since this peak is still present after the purification steps of the product, the PEO or PEG chain must be covalently attached to the nonpolar block. The functionalized PEG chains could be tethered to the PI-PS anion exactly once, since there can be no further reaction of the epoxide groups after the PEO chain is tethered. Otherwise, the peak area of the peak at about 3.7 ppm would be proportionally larger. The peaks in the range of about 2.4-1.2 ppm can be assigned to the protons of the polymer backbone. The quantitative 1H NMR spectrum proves that the desired ordered tri-block copolymer was obtained. The molecular weight fractions of the individual monomers are found to be $M_{n, PI}$=31.2 kg/mol, $M_{n, PS}$=74.4 kg/mol and $M_{n, PEO}$=1.9 kg/mol.

3. Characterization of the Properties of the BCPs

To obtain a polymer electrolyte from the BCP, the BCP and the calculated amount of conducting salt are dissolved in a common solvent or solvent mixture. The obtained solution is filled into Teflon vessels and at room temperature under inert gas atmosphere the solvent is slowly evaporated (over 5 days). The obtained polymer electrolyte membrane is then pressed to the desired thickness and a suitable piece with the desired size is punched out.

Figure 5:
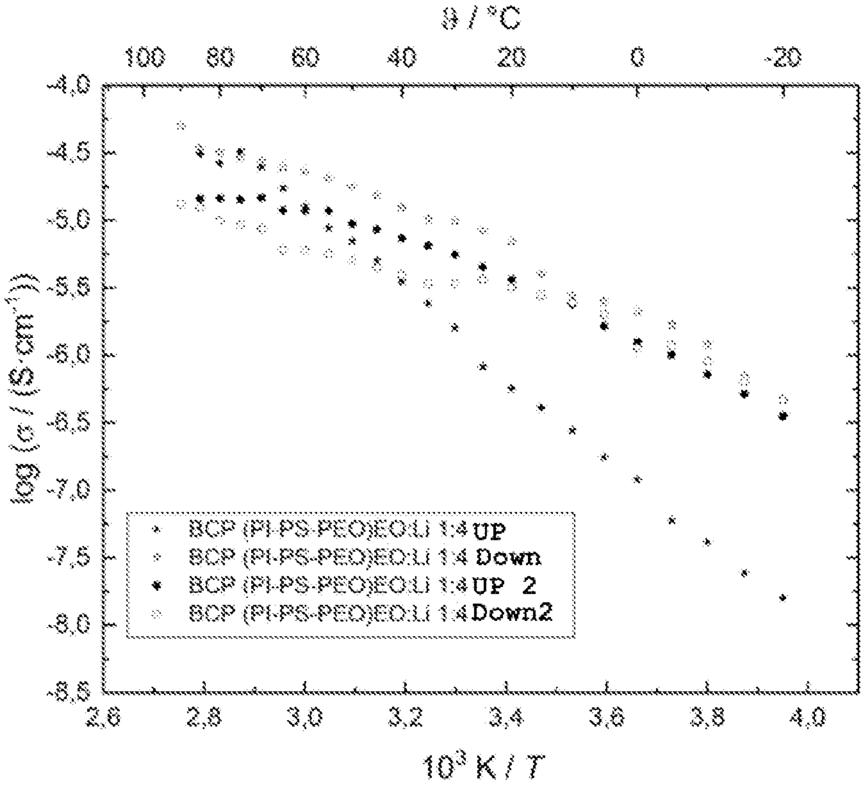
Figure 6:
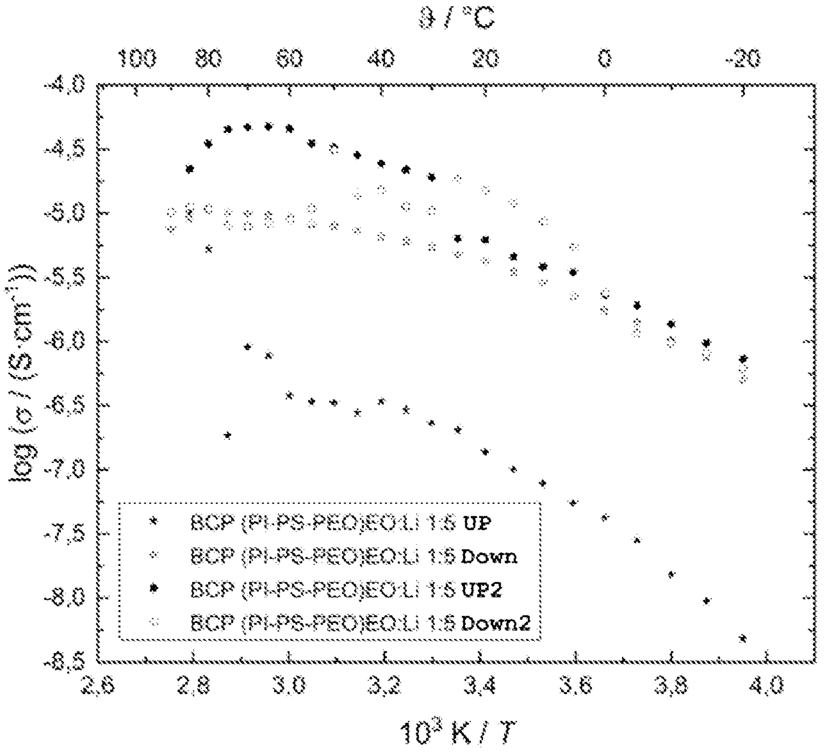

The measurements of the total ionic conductivity of polymer electrolytes from the BCPs prepared according to the invention with different LiTFSI (lithium bis(trifluoromethanesulfonyl)imide) conducting salt concentrations are shown in FIGS. 5 and 6. FIG. 5 shows measurements with an EO:Li ratio of 1 to 4 and FIG. 6 with an EO:Li ratio of 1 to 5. The EO:Li ratio defines how many $Li^+$ ions are present per oxygen atom of a PEO monomer or repeat unit. This describes or indicates the conducting salt concentration within the PEO block of the BCP.

All measurements of the total ionic conductivity are carried out with the same measuring instruments and experimental setup. For this purpose, the sample to be measured is contacted in Coin cells by means of two stainless steel electrodes. The spectra are measured with a Metrohm Multipotentiostat M204 with FRA32 module, Nova 2.1.4 measurement software; frequency range 1 Hz to 1 MHz with an amplitude of 40 mV. The temperature was controlled in a climatic chamber and the evaluation was carried out with Zview2.

FIGS. 5 and 6 show Arrhenius plots of total ionic conductivity. In the results shown in FIGS. 5 and 6, triblock BCPs (consisting of PI-PS-PEO) from the same synthesis approach but with different lithium conducting salt concentrations were measured. The thickness of the membranes was 1.159 mm for the membrane with EO:Li ratio of 1 to 4 (FIG. 4) and 1.052 mm for the membrane with EO:Li ratio of 1 to 5 (FIG. 6). The diameter of both membranes was 15 mm.

FIGS. 5 and 6 each show 4 measurement curves, each based on two heating cycles (filled symbols) and two cooling cycles (unfilled symbols). The samples were first heated from −20 C to 90° C. in 5° C. steps, and in each case an impedance spectrum was recorded and the corresponding conductivity determined from this. The first cycle is indicated by filled stars. Subsequently, the sample is cooled from 90° C. to −20° C. in 5° C. steps, and in each case the impedance or conductivity is measured. This second cycle is characterized by unfilled stars. Subsequently, heating and cooling were performed once again. These two cycles are marked by filled/unfilled circles.

From the conductivities, it can be seen that after the first heating cycle, i.e., in the first cooling cycle, there is a jump in the total ionic conductivity. This is a clear sign that the domains of the BCP have aligned. A "self-assembly" of the BCP has occurred with the formation of a very good lithium ion conducting phase. A salt-rich phase may also have formed. This is critical for the BCPs of the invention. In the subsequent cooling and heating cycle, the total ionic conductivity then approaches a more constant value. This is an indication that the change in structure is maintained. A linear increase in total ionic conductivity with increasing temperature can also be seen. For standard PEO electrolytes, there is usually a stronger temperature dependence, as there is a greater increase in total ionic conductivity at temperatures above 60° C. (the glass transition temperature of the PEO). Based on the conductivities, it can further be assumed that the ion transport is decoupled from the segmental motion of the polymer, since the total ionic conductivity is less dependent on temperature compared to classical PEO electrolytes. This can be attributed to the fact that at low temperatures (below 30° C.) the segmental motion of the polymer is extremely slow.

The overall ionic conductivity achieved in FIGS. 5 and 6 has not yet been optimized and can still be improved, for example, as a function of PEO chain lengths or monomer fractions of the BCP, conducting salt concentration, membrane preparation procedure, amount of residual solvent, and solvent selection (see FIGS. 10 to 15 and their descriptions).

Figure 7:
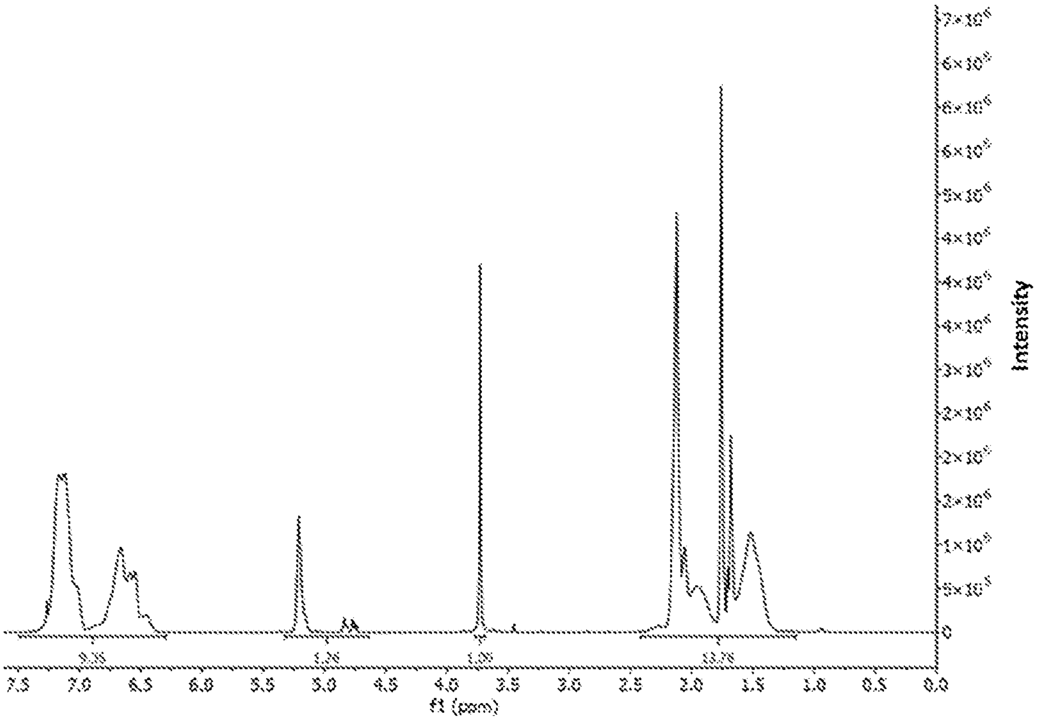
Figure 8:
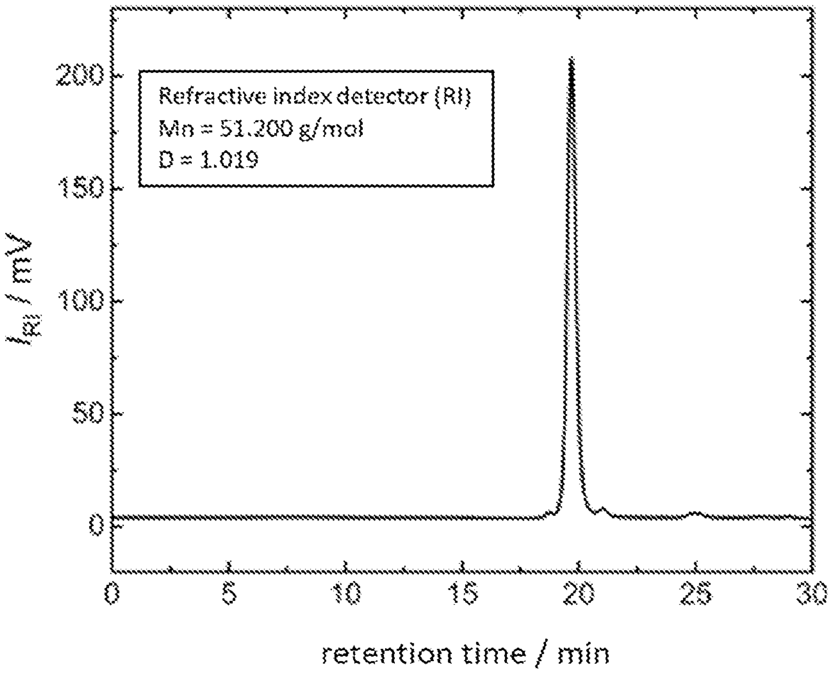
Figure 9:
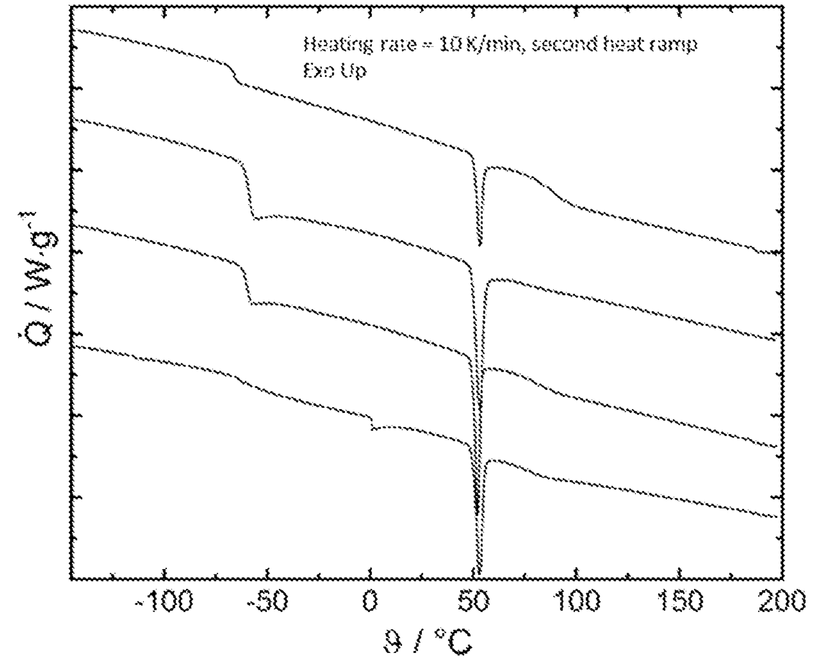

FIGS. 7 and 8 show a quantitative $^1$H-NMR and the corresponding GPC chromatogram of a BCP produced according to the invention. FIG. 7 shows a quantitative $^1$HNMR spectrum of a BCP with a nonpolar PI-PS block and a short, polar PEO block coupled according to the invention. The same peaks can be seen and described as in FIG. 2, with only the ratios or chain lengths of the individual blocks and, accordingly, the corresponding peaks differing in intensity depending on the selected BCP composition. This also applies to the NMRs of the other BCPs produced, which are not shown here. The molecular weight fractions of the individual monomers as well as the corresponding PDIs are listed in the following table and can be seen in the DSC curves (FIG. 9). The molecular weight fractions of the individual monomers of the BCP shown in FIGS. 7 and 8 are $M_{n, PI}$=14.5 kg/mol, $M_{n, PS}$=34.8 kg/mol and $M_{n, PEO}$=1.9 kg/mol. FIG. 8 shows the corresponding GPC chromatogram with the corresponding polydispersity index (PDI) of 1.019 and the total molecular weight $M_{n,ges}$ of 51.2 kg/mol. It is hereby shown that block copolymers with a very small PDI can be prepared according to the invention. The polymers are quasi monodisperse and show only a single molecular weight.

Due to the convergent production process, it is possible to synthesize further block copolymers with varying monomer contents without any problems. For this purpose, only the addition of the initiator, the monomers or the end-functionalized PEG-based chain has to be adjusted according to the desired BCP structure. The BCPs obtained in this way were characterized equivalently as described in FIGS. 1 to 4 or as described in FIGS. 7 and 8. The following results are obtained with respect to the composition and with respect to the PDI:

| PI $M_n$ in kg/mol | PS $M_n$ in kg/mol | PEO $M_n$ in kg/mol | $M_n$ Total in kg/mol | PDI |
|---|---|---|---|---|
| 14.5 | 34.8 | 1.9 | 51.2 | 1.019 |
| 35.1 | 14.8 | | 51.8 | 1.032 |
| 24.8 | 25.0 | | 51.7 | 1.027 |
| 6.8 | 17.3 | | 26.0 | 1.022 |

The experiments show that short polar blocks can be coupled very reproducibly to different non-polar diblock polymers formed by living anionic polymerization. All triblock polymers with a very low polydispersity index of below 1.04 result. Such monodispersities are not representable by the stand-of-the-technology methods. Without being bound by theory, this is due in particular to the fact that living polymerization yields very uniform polymer lengths and the attachment of a defined polar chain does not contribute to the increase in polydispersity. This can be particularly advantageous for very short polar chain blocks, as classical preparation leads to significantly higher deviations in percentage terms. This low PDI of <1.04 is important because the blocks have only one and a desired size, which leads to the formation of highly ordered structures between the individual polymers. Thus, exceptionally high ionic conductivity can be provided by the ordered polar regions of the block copolymers. In addition, due to the bonding of the polar block according to the invention, the polar region exhibits high chemical uniformity.

The 4 different BCPs from the above table are investigated by DSC (DSC-Q2000, TA-Instruments corp., USA) with LNCS (Liquid Nitrogen Cooling System) cooling. Software-assisted Tzero® technology was used to accurately record the baseline (material-specific heat capacity). To increase measurement accuracy, approximately 10 mg of the BCP samples are confined under inert gas in hermetically sealed Tzero® aluminum crucibles, whose thermal signal is stored in the control software (Thermal Advantage), thereby enabling measurement of the specific heat capacity changes at the glass transition. Helium with a flow rate of 25 mL/min is used as purge gas (according to the specifications of the instrument manufacturer) during the measurements. The melting signal of an indium standard is used for the quantitative evaluation of the enthalpy of fusion. The DSC signals are evaluated using Universal Analysis 2000 software (version 4.5A, build 4.5.0.5.). The glass transition signals are evaluated using the "halfheight" method, which results from the tangents of the baseline before and after the heat capacity change. The results of the measurements are shown in FIG. 9.

The curves in FIG. 9 represent in descending order the DSC results of the triblock copolymers with a total molecular weight of 51.2, 51.8, 51.7 and 26.0 kg/mol from the above table. The result of the second heating ramp with a heating rate of 10 K/min in a temperature range from −145° C. to 200° C. is always shown. In the DSC curves of the different BCPs, the phase separation of the three independent polymer blocks can be seen by the $\vartheta_g$ point of the polyisoprene block in the range between −66° C. to −59° C., the $\vartheta_{melting\ point}$ of the PEO block at around 50° C., and the $\vartheta_g$ point of the polystyrene block in the range between 76° C. and 88° C. It is postulated that the larger the chain length in the polyisoprene or polystyrene block, the higher the temperature of the $\vartheta_g$-point and the amount of heat capacity change increases.

By using the process of the invention, the different BCPs described above can be produced by varying the block lengths or ratios to each other, while maintaining the high overall ionic conductivity. It is possible to optimize the mechanical and ion transport properties separately and design a desired BCP without dropping the overall ionic conductivity below that of a PEO reference system (see FIGS. 10 to 15). Crucial to this is that the process according to the invention guarantees a very narrow definition of the chemical design of the ion-conducting block. As a result, an unrivaled high conductivity of the lithium ions and otherwise unattainable lithium ion concentrations could be achieved compared to relevant polymer electrolytes.

In the case of the polymer electrolytes obtained from the triblock copolymers prepared according to the invention, it is particularly noteworthy that they show a constant almost "Arrhenius-like"/linear and low temperature dependence over the entire temperature range (from −20 to 90° C.). This fact together with the exceptionally high and reproducible overall ionic conductivity, conductivity in the $10^{-3}$ S/cm range is obtained at −20° C. and in the $10^{-1.5}$ S/cm range at 90° C., although only less than 4 wt % (cf. FIGS. 10 and 11) and in some cases less than 2 wt % (cf. FIG. 12) of conductive PEO domains are present in the BCP. This suggests that the lithium ions are transported or can move independently (decoupled) from the polymer segment mobility via a "hopping mechanism-like" transport process.

FIGS. 10 to 15 show the temperature dependence of the total ionic conductivity of different triblock copolymers prepared according to the invention, where in some cases other solvents were also used for solution casting of the polymer electrolytes, in an Arrhenius diagram.

Figure 10:
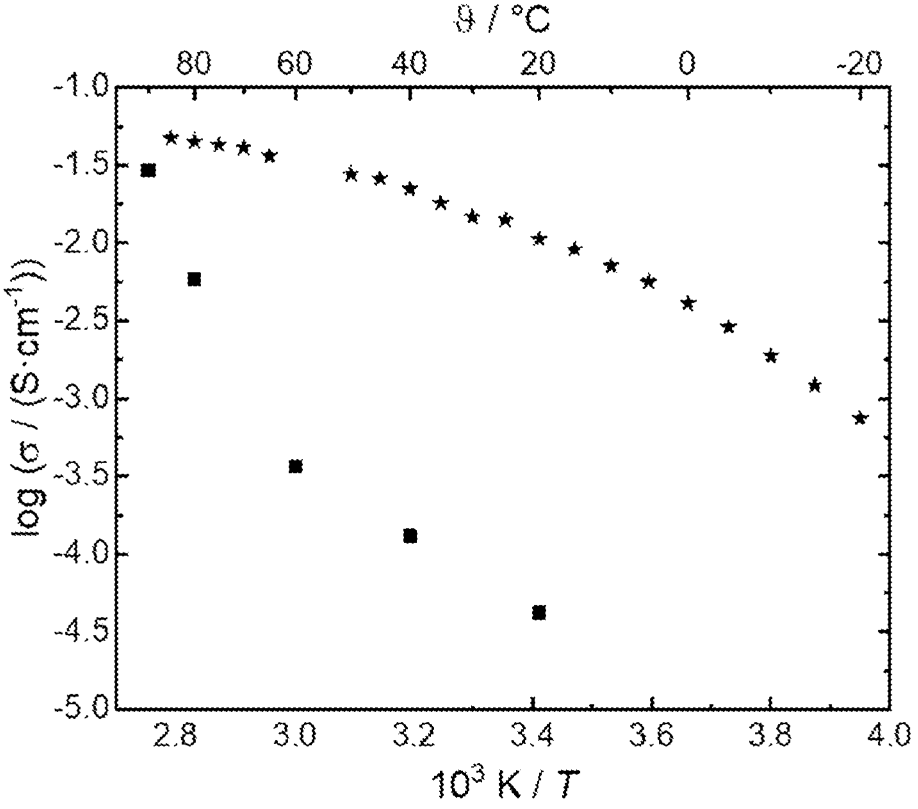

FIG. 10 shows the results for a PI-PS-PEO triblock copolymer with a total molecular weight of 51.2 kg/mol. The composition of the blocks corresponds to the data in the table above. Functional binding of the PEO block was achieved via functionalization with epichlorohydrin. LiTFSI was used as the polymer electrolyte as a conducting salt in an EO:Li ratio of 1:4.24. In addition, less than 18 wt % (based on total mass of polymer electrolyte) of THF was still present in the polymer electrolyte as a residual solvent from solution casting. The measured polymer electrolyte membrane piece had a layer thickness of 440 μm and a diameter of 6 mm. Two different curves are shown in the diagram. The upper curve (stars) represents the results at equilibrium with constant values of conductivity. The lower curve (squares) represents the result from the first heating cycle. It can be seen that in order to form a reproducible, reversible conductivity, the system must first be heated at least once to 90° C. (above the glass transition temperature of the polystyrene) to bring the system to thermodynamic equilibrium (in this regard, see the previous description for FIGS. 5 and 6). Without being bound by theory, both the formation of ordered polymeric structures between the individual BCPs, the intercalation of Li ions into the polar domains, and the alignment of the ion-loaded polar domains into coherent "conductance domains" appear to require some activation energy, which can be achieved by heating to 90° C. at least once. It can be seen that at equilibrium an exceptionally high and reproducible total ionic conductivity, at −20° C. and a conductivity in the $10^{-3}$ S/cm range and greater than 45 mS/cm at 90° C. is achieved. Furthermore, the total ionic conductivity shows a constant almost "Arrhenius-like"/linear and low temperature dependence over the entire temperature range. This high conductivity is maintained even after intensive temperature treatment, i.e. the sample was always tempered between −20° C. and 90° C. for several weeks in total. Surprisingly, this observation shows that the residual solvent remaining in the polymer electrolyte is firmly "incorporated" into the "structure" and is located only in the PEO domain. Moreover, this long-term thermal stability shows that the lithium ion concentration as well as the highly ordered lamellar structure is stabilized by the BCP prepared according to the invention.

Figure 11:
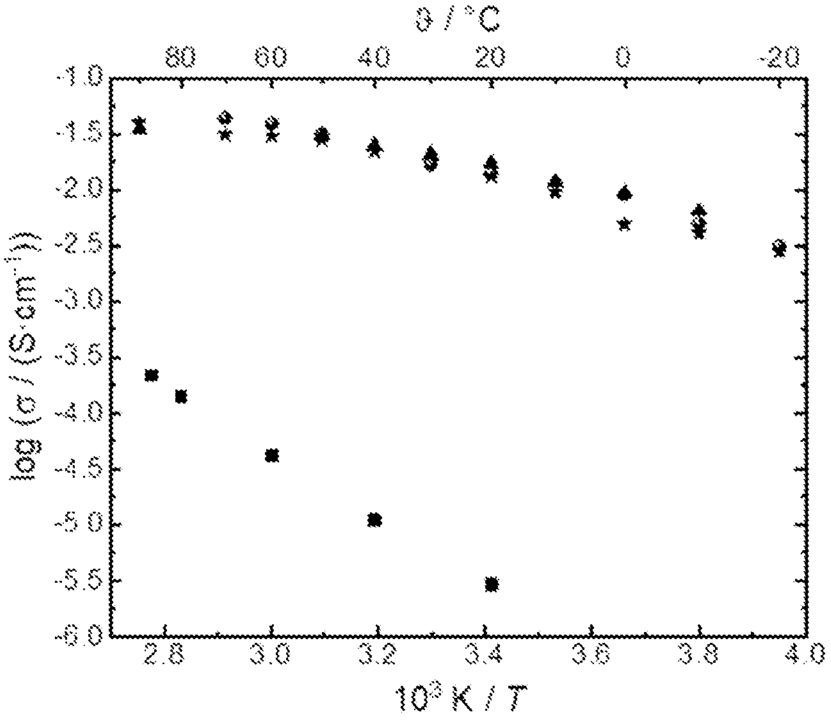

FIG. 11 shows the results for a PI-PS-PEO triblock copolymer with a total molecular weight of 51.2 kg/mol (see above table for the composition of the individual blocks) for an EO:Li ratio of 1:5.03, where LiTFSI was used as the conducting salt. In addition, less than 20 wt % (based on the total mass of the polymer electrolyte) of THF was still present in the polymer electrolyte as a residual solvent from solution casting. The measured polymer electrolyte membrane piece had a layer thickness of 240 μm and a diameter of 6 mm. The lower curve (squares) shows the results of the first heating cycle, while the upper three curves (stars, circles and triangles) represent results of different heating curves after reaching the equilibrium state. It can be seen that at equilibrium, the total ionic conductivity at very low temperatures (−20° C.) is in the $10^{-2.5}$ S/cm range and has very little temperature dependence. At 90° C., this is in the $10^{-1.5}$ S/cm range. Compared to the first heating cycle, a jump of in some cases four decades is achieved. It is highly unusual for a polymer-based solid electrolyte to have—a lithium ion conductivity greater than 1 mS/cm at −20° C. In particular, the conductivity at −20° C.—appears to be useful to a high degree for use as an electrolyte in alkali ion secondary batteries, according to the current common definition. Normally, the limit of lithium ion conductivity of greater than 1 mS/cm is reached only above 30° C.

Figure 12:
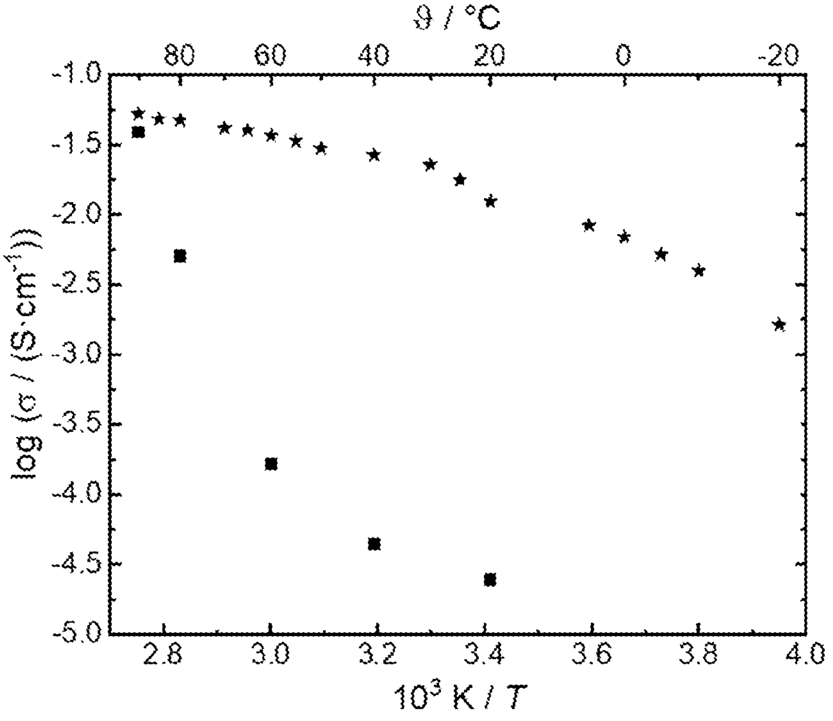

FIG. 12 shows the results for a PI-PS-PEO triblock copolymer with a total molecular weight of 107.5 kg/mol. The block distribution is as follows $M_{n, PI}$=31.2 kg/mol, $M_{n, PS}$=74.4 kg/mol and $M_{n, PEO}$=1.9 kg/mol and the results were obtained with an EO:Li ratio of 1:9.75. LiTFSI was used as the conducting salt. In addition, less than 20 wt % (based on total mass of polymer electrolyte) of THF was still present in the polymer electrolyte as a residual solvent from solution casting. The measured polymer electrolyte membrane piece had a layer thickness of 420 μm and a diameter of 6 mm. The lower curve (squares) shows the results of the first heating cycle, while the upper curve (stars) shows the results after reaching equilibrium. It can be seen that at equilibrium at −20° C. the lithium ion conductivity is greater than 1 mS/cm and the total ionic conductivity at 90° C. is greater than 50 mS/cm (see the description to FIG. 11 for further interpretation of these conductivities). Furthermore, it can be seen that the total ionic conductivity of the polymer electrolytes is given a very low temperature dependence by using the BCPs prepared according to the invention. It is particularly noteworthy that the very high lithium ion conductivities of the polymer electrolytes of FIGS. 11 and 12 hardly differ from each other, even though the BCP of FIG. 12 has only half of the conductive PEO domains compared to the BCP of FIG. 11, since at the same PEO chain length of 1900 kg/mol, the total molecular weight of the BCP of FIG. 12 of 107.5 kg/mol is about twice as high as the total molecular weight of 51.2 kg/mol of FIG. 11. Crucial to this surprising result is that the process according to the invention guarantees a very narrow definition of the chemical design of the ion-conducting block, and thus an otherwise unattainable high lithium ion concentration can be accommodated and stabilized in these very short blocks. Highly ordered lamellar structures can be formed independently of the BCP composition (see also FIG. 13 and its description).

Figure 13:
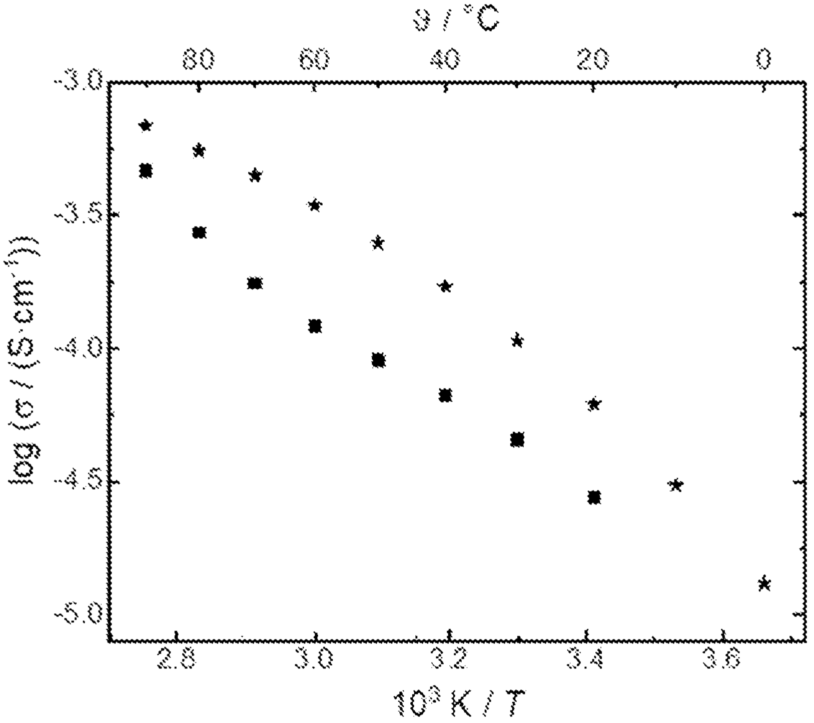

FIG. 13 shows the results for a PI-PS-PEO triblock copolymer with a total molecular weight of 51.8 kg/mol with an EO:Li ratio of 1:4.99 and LiTFSI as the conducting salt. The composition of the blocks is given in the table above. In addition, less than 30 wt % (based on total mass of polymer electrolyte) of THF was still present in the polymer electrolyte as residual solvent from solution casting. The measured polymer electrolyte membrane piece had a layer thickness of 360 μm and a diameter of 9 mm. The lower curve (squares) shows the results of the first heating cycle, while the upper curve (stars) shows the results after reaching the equilibrium state after the 4th heating cycle. It can be seen that at equilibrium the total ionic conductivity shows a linear temperature dependence. The conductivity jump in the measured temperature range (from 0° C. to 90° C.) between the first and fourth heating cycle is less than half a decade in magnitude and is thus much less pronounced compared to the conductivity jumps from FIGS. 10 to 12. The BCP used in this polymer electrolyte was optimized for better processing and electrode contacting, i.e., the proportions or chain lengths of the structuring nonpolar blocks (polyisoprene and polystyrene) were varied (see table above), while the chain length of the polar PEO block, which is exclusively responsible for lithium ion transport, was left the same at 1.9 kg/mol. By increasing the polyisoprene content and simultaneously reducing the polystyrene content, the mechanical properties of the BCP could be controlled such that it became very flexible. Surprisingly, despite the very flexible BCP, the highly ordered structure and associated good overall ionic conductivity of the polymer electrolyte (above that of the standard PEO reference system over the entire temperature range) has not been lost. Crucial to this amazing result is that a very tight definition of the chemical design of the ion-conducting PEO block is guaranteed, allowing an otherwise unattainable high concentration of lithium ions to be intercalated and stabilized in these very short blocks. This allows the highly ordered structure to form independently of the BCP composition (see also FIG. 12 and its description in this regard).

Figure 14:
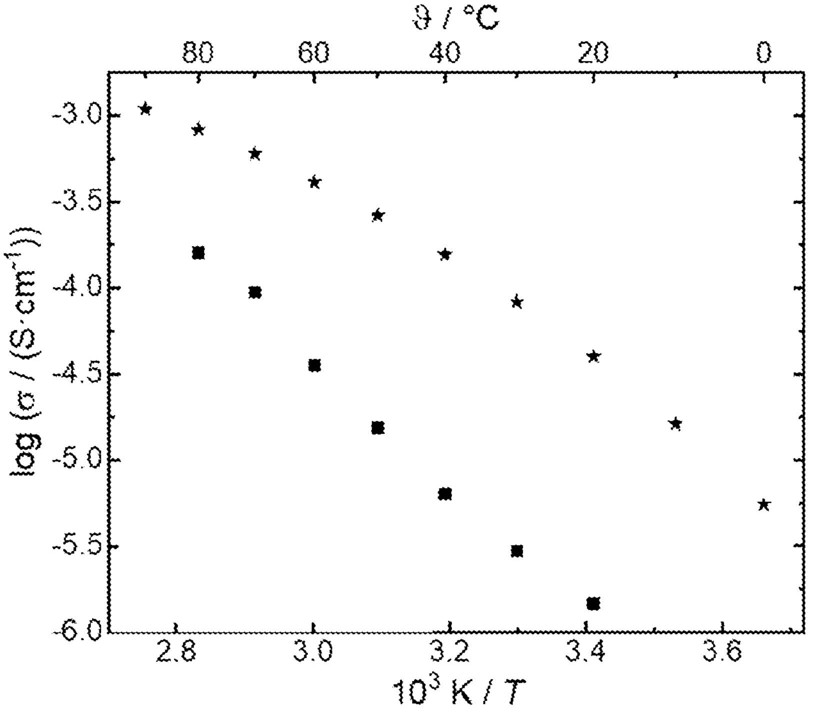

FIG. 14 shows the results for a PI-PS-PEO triblock copolymer with a total molecular weight of 107.5 kg/mol. The block distribution is as follows $M_{n, PI}$=31.2 kg/mol, $M_{n, PS}$=74.4 kg/mol and $M_{n, PEO}$=1.9 kg/mol and the results were obtained with an EO:Li ratio of 1:2. LiTFSI was used as the conducting salt. In addition, less than 13 wt % (based on total mass of polymer electrolyte) of a mixture of MTBE and DMC was still present in the polymer electrolyte as a residual solvent from solution casting. The measured polymer electrolyte membrane piece had a layer thickness of 620 μm and a diameter of 9 mm. The lower curve (squares) shows the results of the first heating cycle, while the upper curve (stars) shows the results after reaching the equilibrium state. It can be seen that at equilibrium the total ionic conductivity exhibits a linear temperature dependence and is above the PEO standard reference system over the entire temperature range. This high conductivity is maintained even after intensive temperature treatment, i.e., the sample was tempered between 0° C. and 90° C. for several weeks in total. Surprisingly, this observation shows that a suitable solvent selection is not limited to THF. Other solvents or solvent mixtures can be used flexibly without losing the desired ion transport properties of the polymer electrolyte. Crucial to this surprising result is that a very tight definition of the chemical design of the ion-conducting PEO block is guaranteed, and thus an otherwise unattainable high lithium ion concentration can be introduced and stabilized in these very short blocks. Highly ordered structures result, independent of the BCP composition and the choice of solvent or solvent mixture. The solvent molecules are apparently "held" in the polymer electrolyte. When replacing the THF with another solvent, care must be taken to ensure that not only the conducting salt, but also the entire BCP dissolves completely first, so that the conducting salt can settle into the PEO block/domain through the slow solvent evaporation of solution casting and self-assembly, and the conducting domains can align. Preferably, a mixture of at least two solvents can be used for this purpose. Combinations of MTBE and DMC or GBL or PC, for example, have been found to be particularly advantageous. MTBE can dissolve only the non-polar part and DMC/GBL or PC only the polar part of the BCP including the various conducting salts. (see also FIG. 15 and its description).

Figure 15:
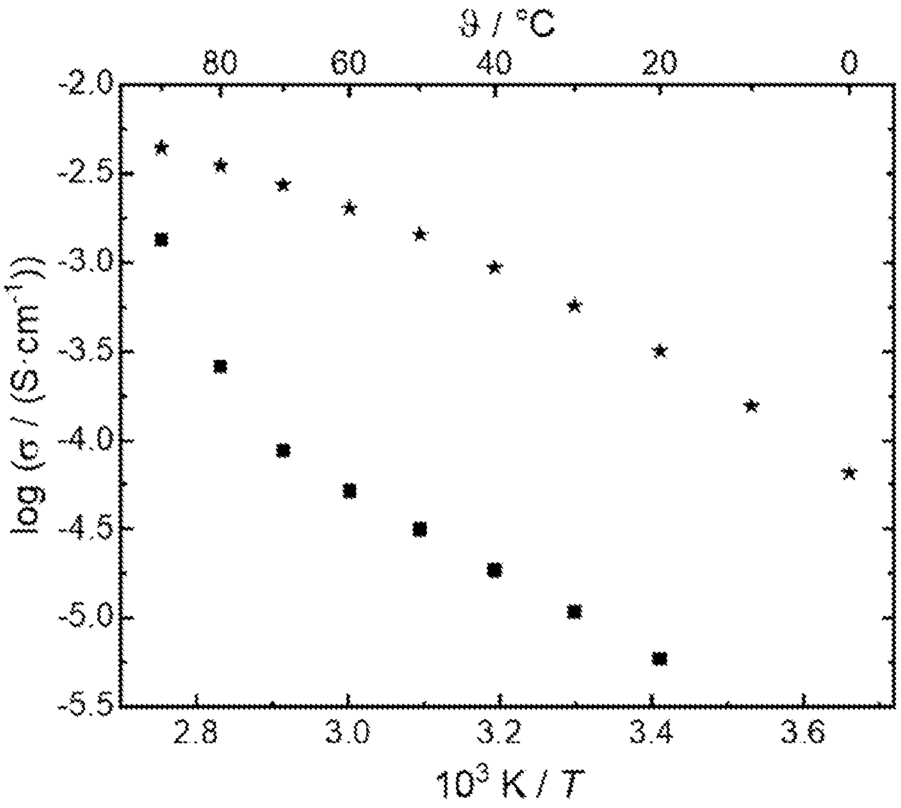

FIG. 15 shows the results for a PI-PS-PEO triblock copolymer with a total molecular weight of 107.5 kg/mol. The block distribution is as follows $M_{n, PI}$=31.2 kg/mol, $M_{n, PS}$=74.4 kg/mol and $M_{n, PEO}$=1.9 kg/mol and the results were obtained with an EO:Li ratio of 1:10.04 using LiTFSI as the conducting salt. In addition, there was still less than 17 wt % (based on total mass of polymer electrolyte) from the mixture of THF and PC as the residual solvent from solution casting in the polymer electrolyte. The measured polymer electrolyte membrane piece had a layer thickness of 400 μm and a diameter of 10.5 mm. The lower curve (squares) shows the results of the first heating cycle, while the upper curve (stars) shows the results after reaching the equilibrium state. It can be seen that at equilibrium, in addition to the linear temperature dependence, the total ionic conductivity is well above that of the PEO standard reference system over the entire temperature range. This high conductivity is maintained even after intensive temperature treatment, i.e. the sample was always tempered between 0° C. and 90° C. for several weeks (see the description of FIG. 15 for a more detailed interpretation of these conductivities). In addition to the PC, polymer electrolytes were also prepared and measured with GBL (not shown here) in addition to THE as an additional solvent additive or co-solvent. In all cases, the conductivity is significantly better than that of the PEO standard reference system. It can therefore be seen that this very good overall ionic conductivity is not a function of the THF alone, but, as previously described, of the particular structure of the BCP in particular the ion-conducting PEO block and the high conducting salt concentration within it.

The invention claimed is:

1. A process for the sequential and convergent preparation of ordered block copolymers comprising at least one non-polar and one polar polymer block, characterized in that the non-polar block is built up via a living sequential anionic polymerization by means of a Li-organyl initiator having a pKa greater than or equal to 45 from monomers selected from the group consisting of conjugated dienes, styrene, vinylsilane, vinylnaphthalene, vinylmetallocene, their derivatives or mixtures thereof and the polar block is a polymer block having a molecular weight greater than or equal to 350 g/mol and less than or equal to 5000 g/mol and being composed of monomers selected from the group consisting of C2-C10 oxacyclo compounds, their derivatives or mixtures of at least two different monomers thereof, the polar polymer block being covalently linked in a convergent manner to the non-polar block anion via an epoxy functionalization of one of the monomers of the polar block, obtained via a reaction of this monomer with epichlorohydrin, in a non-polar solvent in the presence of free Li ions.

2. Process according to claim 1, wherein the polar block is a polyethylene oxide block.

3. Process according to claim 1, wherein the nonpolar solvent is selected from the group of aromatic hydrocarbons or mixtures thereof.

4. Process according to claim 1, wherein the Li-organyl initiator is an alkylithium initiator having a pKa greater than or equal to 50.

5. Block copolymer obtained by a process according to claim 1.

6. Block copolymer according to claim 5, wherein the polar block and the whole block copolymer have a polydispersity of greater than or equal to 1.0 and less than or equal to 1.05.

7. Block copolymer according to claim 5, wherein the block copolymer has a molecular weight greater than or equal to 20 kg/mol and less than or equal to 250 kg/mol.

8. Block copolymer according to claim 5, wherein the polar polymer block is a polyethylene oxide block, wherein the polyethylene oxide block has a molecular weight greater than or equal to 450 g/mol and less than or equal to 3000 g/mol.

9. Block copolymer according to claim 5, wherein the nonpolar polymer block is a polyisoprene-polystyrene diblock polymer and polar polymer block is a polyethylene oxide block, wherein the weight ratio of polar to non-polar block polymer fractions, expressed as weight polar block divided by weight total block polymer, is greater than or equal to 0.5% and less than or equal to 10%.

10. An alkali ion battery having a polymer electrolyte comprising the copolymer according to claim 5.

11. The alkali ion battery according to claim 10, wherein the EO/alkali ion ratio in the polymer electrolyte of the alkaline ion battery is greater than or equal to 1:1 and less than or equal to 1:20.

12. Polymer electrolyte for an alkali ion battery, characterized in that the polymer components of the polymer electrolyte comprise the block copolymers according to claim 5.

13. Polymer electrolyte according to claim 12, wherein the polymer components of the polymer electrolyte consist of the block copolymers.

14. Polymer electrolyte according to claim 12, wherein the polymer electrolyte has an ionic conductivity at −20° C. greater than or equal to 1 mS/cm.

15. Polymer electrolyte according to claim 12, wherein the polymer electrolyte has an ionic conductivity of greater than or equal to 1 mS/cm in a temperature range of greater than or equal to −20° C. and less than or equal to 90° C.

16. Polymer electrolyte according to claim 12, wherein the polymer electrolyte has a residual solvent content of greater than or equal to 0.1 wt % and less than or equal to 30 wt %.

* * * * *